(12) United States Patent
Haber et al.

(10) Patent No.: US 11,183,880 B2
(45) Date of Patent: Nov. 23, 2021

(54) WIRELESS CHARGING GRIPPING APPARATUS FOR HANDHELD DEVICE

(71) Applicant: Tzumi Electronics LLC, New York, NY (US)

(72) Inventors: Shimon Haber, Brooklyn, NY (US); Lawrence T. Levine, Easton, CT (US); Noam Elharar, New York, NY (US)

(73) Assignee: Tzumi Electronics LLC, New York, NY (US)

( * ) Notice: Subject to any disclaimer, the term of this patent is extended or adjusted under 35 U.S.C. 154(b) by 0 days.

(21) Appl. No.: 17/282,613

(22) PCT Filed: Oct. 4, 2019

(86) PCT No.: PCT/US2019/054806
§ 371 (c)(1),
(2) Date: Apr. 2, 2021

(87) PCT Pub. No.: WO2020/072965
PCT Pub. Date: Apr. 9, 2020

(65) Prior Publication Data
US 2021/0320524 A1 Oct. 14, 2021

Related U.S. Application Data

(60) Provisional application No. 62/741,495, filed on Oct. 4, 2018.

(51) Int. Cl.
*H01M 10/46* (2006.01)
*H02J 50/00* (2016.01)
(Continued)

(52) U.S. Cl.
CPC .......... *H02J 50/005* (2020.01); *H02J 7/0044* (2013.01); *H02J 50/10* (2016.02); *H02J 2310/22* (2020.01)

(58) Field of Classification Search
CPC ........ H02J 7/0044; H02J 7/0042; H02J 50/10; H02J 50/005; H02J 2310/22
(Continued)

(56) References Cited

U.S. PATENT DOCUMENTS 8,395,353 B2  3/2013  Wang et al.
8,737,066 B1  5/2014  Block
(Continued)

OTHER PUBLICATIONS

International Search Report of PCT Application No. PCT/US2019/054806, dated Dec. 19, 2019.

*Primary Examiner* — Edward Tso
(74) *Attorney, Agent, or Firm* — Pearl Cohen Zedek Latzer Baratz LLP (57) ABSTRACT

An apparatus for gripping a portable electronic device can be used with a wireless charger to charge the portable electronic device when the device and the wireless charger are not in direct contact. The apparatus has a base element adapted to be attached to the electronic device and a gripping element connected to the base element, and further includes a first electrical induction coil arranged within the gripping element and configured to generate an electrical current as a result of a magnetic field in the wireless charger, as well as a second electrical induction coil arranged within the base element and configured to generate a magnetic field so as to induce an electrical current inside the portable electronic device, wherein the first electrical induction coil is configured to conduct electricity to the second electrical induction coil, either through induction or through direct conduction.

17 Claims, 7 Drawing Sheets

(51) Int. Cl.
*H02J 7/00* (2006.01)
*H02J 50/10* (2016.01)
(58) Field of Classification Search
USPC .................. 320/107, 108, 114, 115; 307/104
See application file for complete search history.

(56) References Cited

U.S. PATENT DOCUMENTS

| | | |
|---|---|---|
| 10,244,854 B1 | 4/2019 | Haber et al. |
| 10,397,966 B1* | 8/2019 | DiGiovanna ........ H04B 5/0075 |
| 2004/0145343 A1* | 7/2004 | Naskali ..................... H02J 7/02 |
| | | 320/108 |
| 2009/0302799 A1 | 12/2009 | Marquet et al. |
| 2016/0003270 A1* | 1/2016 | Franklin ............... H01F 7/0221 |
| | | 439/529 |
| 2018/0220782 A1 | 8/2018 | Mody et al. |

* cited by examiner

WIRELESS CHARGING GRIPPING APPARATUS FOR HANDHELD DEVICE

CROSS-REFERENCE TO RELATED APPLICATIONS

This application is a National Phase Application of PCT International Application No. PCT/US2019/054806, International Filing Date Oct. 4, 2019, claiming the benefit of U.S. Patent Application No. 62/741,495, filed Oct. 4, 2018, which is hereby incorporated by reference.

FIELD OF THE INVENTION

The present invention relates to a gripping apparatus, more particularly to an apparatus for gripping a handheld device that can be used with a wireless charger to charge the handheld device when the device and charger are not in direct contact.

BACKGROUND OF THE INVENTION

The use of handheld electronic computing devices, such as smartphones, is prevalent in today's society, to the extent that users often grip their smartphones while performing other tasks. In general, the typically-rectangular shape of such devices allows a user to securely grip such a device with a one hand while accessing the device's touch screen with the other hand. However, the rectangular shape of such devices may create difficulty when the user desires to access the device's touch screen with the same hand that the user is using to grip the device or when performing other tasks. Similarly, if a user is moving about and holding the portable computing device in one hand, it can be unwieldy to manipulate and rotate the portable computing device, particularly while attempting to perform other tasks at the same time. This difficulty presents a risk that the user may fumble the device, lose control of it and drop it, and often results in users damaging their devices. Therefore, a user may not easily operate such a handheld device with one hand, even when securely gripping the device with the fingers.

There are some apparatuses that enable a user to securely and comfortably hold such portable electronic devices with a single hand while allowing greater range of movement of the user's fingers while holding the device, including those described in commonly-assigned U.S. Pat. No. 10,244,854 to Haber et al.

In addition, many portable electronic devices in use nowadays are capable of wireless charging. One international standard for wireless charging, called Qi, has been adopted by many phone and charger suppliers for wireless charging and relies on electromagnetic induction between planar coils in the charger and in the electronic device via resonant inductive coupling. Inductive charging uses an electromagnetic field to facilitate the exchange of energy between two objects, wherein a first induction coil placed within a charging station creates an electromagnetic field, and a second induction coil placed on the portable device being charged takes power from the electromagnetic field and converts it into an electrical current that is used to charge the device. For lower power charging, typical of smartphone chargers, the electronic device and wireless charger must be spaced very close together, i.e., either in direct or very close contact, e.g., not more than 8 mm away from each other.

In order for the portable electronic device to be charged wirelessly, the back of the electronic device must generally be set on or against the surface of the wireless charger. However, prior art gripping apparatuses that are mounted to the backs of portable electronic devices will cause problems for wireless charging, because, when the electronic device is placed on a wireless charging pad, the gripping apparatus that is mounted to the back of the electronic device will space the electronic device sufficiently far from the charging pad surface so as to disrupt or prevent wireless charging.

It is desirable to provide a gripping apparatus into which a user can insert his/her fingers to grip a handheld electronic device with one hand, that is able to securely grip the user's fingers between the apparatus and the handheld electronic device and allow the user's fingers to comfortably fit around the gripping apparatus, that can also be used with a wireless charger to charge the electronic device or to enable the handheld device to be charged when the device and charger are not in direct contact.

SUMMARY OF THE INVENTION

In accordance with these and other objects of the invention, the invention is directed to a device or apparatus for assisting a user in gripping a portable electronic device that can be used with a wireless charger to charge the electronic device or to enable the handheld device to be charged when the electronic device and charger are not in direct contact.

In one embodiment, the invention is directed to a gripping apparatus that can be attached to a handheld electronic device and can be mounted against a wireless charger, such that the gripping apparatus operates as a transfer station by conducting the electricity from the wireless charger to the electronic device.

In certain embodiments, the invention is directed to an improved apparatus for gripping a portable electronic device and for facilitating wireless charging of the portable electronic device via an external wireless charging apparatus when the portable electronic device is not in direct contact with the external wireless charging apparatus, the apparatus having a base element adapted to be attached to the electronic device and a gripping element connected to the base element, the apparatus comprising a first electrical induction coil arranged within the gripping element and a second electrical induction coil arranged within the base element, wherein the first electrical induction coil is configured to generate an electrical current as a result of a magnetic field in the external wireless charging apparatus, wherein the first electrical induction coil is configured to conduct electricity to the second electrical induction coil, and wherein the second electrical induction coil is configured to generate a magnetic field so as to induce an electrical current inside the portable electronic device.

In some embodiments, the first electrical induction coil is arranged proximal to an external surface of the gripping element and is configured such that, when the external surface of the gripping element is placed proximal to the external wireless charging apparatus, the first electrical induction coil can generate an electrical current as a result of a magnetic field in the external wireless charging apparatus.

In some embodiments, the second electrical induction coil is arranged proximal to an external surface of the base element and is configured such that, when the external surface of the base element is placed proximal to the portable electronic device, the second electrical induction coil can generate a magnetic field so as to induce an electrical current inside the electronic device sufficient to charge the portable electronic device.

In certain embodiments, the external surface of the base element has an adhesive layer thereon for securely attaching the base element to the portable electronic device.

In some embodiments, the first electrical induction coil is arranged proximal to an internal surface of the gripping element and the second electrical induction coil is arranged proximal to an internal surface of the base element such that, when the internal surface of the gripping element is placed proximal to or against the internal surface of the base element, the first electrical induction coil is configured to conduct electricity to the second electrical induction coil via induction.

In certain embodiments, when the internal surface of the gripping element is placed proximal to or against the internal surface of the base element, the first electrical induction coil is configured to generate a magnetic field so as to induce an electrical current inside the second electrical induction coil.

In some embodiments, the apparatus further comprises at least one direct electrical connection between the gripping element and the base element, wherein, when an internal surface of the gripping element is placed against an internal surface of the base element, the first electrical induction coil is configured to conduct electricity to the second electrical induction coil via direct conduction. In some embodiments, there is only one direct electrical connection between the gripping element and the base element.

In certain embodiments, the at least one direct electrical connection comprises at least one conductive pin on one of the gripping element and the base element, and at least one PCB trace circle on the other of the gripping element and the base element. In some embodiments, there are one or two conductive pins on one of the gripping element and the base element, and one or two PCB trace circles on the other of the gripping element and the base element.

In certain embodiments, the apparatus further comprises a connecting element for connecting the gripping element and the base element at respective attachment regions thereof, wherein said respective attachment regions comprise means for direct electrical conduction between the gripping element and the base element when the internal surface of the gripping element is placed against the internal surface of the base element.

In some embodiments, when the base element is placed against or proximal to the electronic device, the gripping element is placed against or proximal to the base element and the gripping element is placed against or proximal to the external wireless charging apparatus, the magnetic field in the external wireless charging apparatus effectively charges the portable electronic device through the first electrical induction coil and the second electrical induction coil.

In certain embodiments, the invention is directed to an apparatus for gripping a portable electronic device and for charging the portable electronic device via a wireless charger when the device and the wireless charger are not in direct contact, the apparatus comprising a base element adapted to be attached to the electronic device, a gripping element connected to the base element, a first electrical induction coil arranged within the gripping element and configured to generate an electrical current as a result of a magnetic field in the wireless charger, and a second electrical induction coil arranged within the base element and configured to generate a magnetic field so as to induce an electrical current inside the portable electronic device, wherein the first electrical induction coil is configured to conduct electricity to the second electrical induction coil, either through induction or through direct conduction.

In some embodiments, the first electrical induction coil is arranged proximal to an internal surface of the gripping element and the second electrical induction coil is arranged proximal to an internal surface of the base element such that, when the internal surface of the gripping element is placed proximal to the internal surface of the base element, the first electrical induction coil is configured to conduct electricity to the second electrical induction coil via induction.

In certain embodiments, when the internal surface of the gripping element is placed proximal to the internal surface of the base element, the first electrical induction coil is configured to generate a magnetic field so as to induce an electrical current inside the second electrical induction coil.

In some embodiments, the apparatus further comprises at least one direct electrical connection between the gripping element and the base element, wherein, when the internal surface of the gripping element is placed against the internal surface of the base element, the first electrical induction coil is configured to conduct electricity to the second electrical induction coil via direct conduction through the at least one direct electrical connection.

In certain embodiments, the at least one direct electrical connection comprises at least one conductive pin on one of the gripping element, and the base element and at least one PCB circle on the other of the gripping element and the base element.

In certain embodiments, the apparatus further comprises a connecting element for connecting the gripping element and the base element at respective attachment regions thereof, wherein said respective attachment regions comprise means for direct electrical conduction between the gripping element and the base element when the internal surface of the gripping element is placed against the internal surface of the base element.

In some embodiments, when the base element is placed against or proximal to the electronic device, the gripping element is placed against or proximal to the base element and the gripping element is placed against or proximal to the external wireless charging apparatus, the magnetic field in the external wireless charging apparatus effectively charges the portable electronic device through the first electrical induction coil and the second electrical induction coil.

In one embodiment, the apparatus has a base element adapted to be attached to the portable electronic device, wherein the base element has a top surface with an attachment region and a bottom surface configured to mount the base element onto the portable electronic device; a gripping element, wherein the gripping element has a bottom surface with an attachment region; and a stretchable cord connecting the base element and the gripping element at the respective attachment regions thereof; wherein the attachment regions of the base element and of the gripping element have respective electrical conduction means to facilitate energy transfer from the charger to the portable electronic device.

In some embodiments, the attachment regions of the base element and of the gripping element have respective corresponding engaging elements that cooperate with one another to permit the base element and the gripping element to be secured against or engaged with one another.

In certain embodiments, the engaging elements comprise one or more protrusions on the attachment region of one of the gripping element or the base element and one or more indentations on the attachment region of the other of the gripping element or the base element, wherein the gripping element may be secured against or engaged with the base element by insertion of the one or more protrusions into the one or more indentations when the gripping element is placed against the base element. In some of these embodiments, the one or more protrusions fit tightly into the one or more indentations.

In certain embodiments, the engaging elements comprise a raised or an indented circular gear-shaped section on the attachment region of one of the gripping element or the base element and a plurality of projections on the attachment region of the other of the gripping element or the base element, wherein, if the circular gear-shaped section is raised, the circular gear-shaped section has a plurality of circumferential teeth therearound with a gap between each two of the plurality of teeth, and wherein each of the plurality of projections is shaped to fit within a gap; wherein, if the circular gear-shaped section is indented, the circular gear-shaped section has a plurality of circumferential tooth slots therearound with a peak between each two of the plurality of tooth slots, and wherein each of the plurality of projections is shaped to fit within a tooth slot; and wherein the gripping element may be secured against or engaged with the base element by insertion of the one or more projections into one or more respective gaps or one or more respective tooth slots when the gripping element is placed against the base element.

In some such embodiments, the one or more projections fit tightly into the one or more respective gaps or into the one or more respective tooth slots. In some of these embodiments, the gripping element may be secured against or engaged with the base element in any rotational position relative thereto.

In certain embodiments, the base element and the gripping element of the gripping apparatus are both fitted with inductive coils in order to facilitate energy transfer between the base element and the gripping element so as to extend the transmission distance of energy from a wireless charger on which the gripping element is resting to a portable electronic device attached to the base element.

BRIEF DESCRIPTION OF THE DRAWINGS

In order for the present invention to be better understood and for its practical applications to be appreciated, the following figures are provided and referenced hereafter. It should be noted that the Figures are given as examples only and in no way limit the scope of the invention. Like components are denoted by like reference numerals.

It should be noted that the embodiments depicted are shown only schematically, and that not all features may be shown in full detail or in proper proportion. Certain features or structures may be exaggerated relative to others for clarity. It should be noted further that the embodiments shown are examples only and should not be construed as limiting the scope of the present disclosure or appended claims.

DETAILED DESCRIPTION OF THE INVENTION

In the following detailed description, various embodiments of the present invention will be described with reference to the accompanying drawings, and numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a description of known functions and configurations incorporated herein will be omitted when it may make the subject matter of the present invention rather unclear.

In the following description, orientation of physical objects has been described with terms such as "top", "back", "front" and "back". The terms are not specific to the particular orientation described and are not to be construed as limiting with respect to the direction or orientation of the physical objects described, but may be used to refer to any sides or faces of the physical objects, as long as the orientation described is consistently referred to.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Unless otherwise indicated, the conjunction "or" as used herein is to be understood as inclusive (any or all of the stated options).

Commonly-assigned U.S. patent application Ser. No. 15/958,746 describes in great detail several embodiments of an apparatus for gripping a handheld electronic device, and that description is incorporated herein by reference in its entirety. The present invention builds upon that application by disclosing at least one such apparatus that incorporates electrical conduction means to enable such a gripping apparatus to be used with a wireless charger to charge the handheld device or to enable the handheld device to be charged when the device and charger are not in direct contact.

Figure 1:
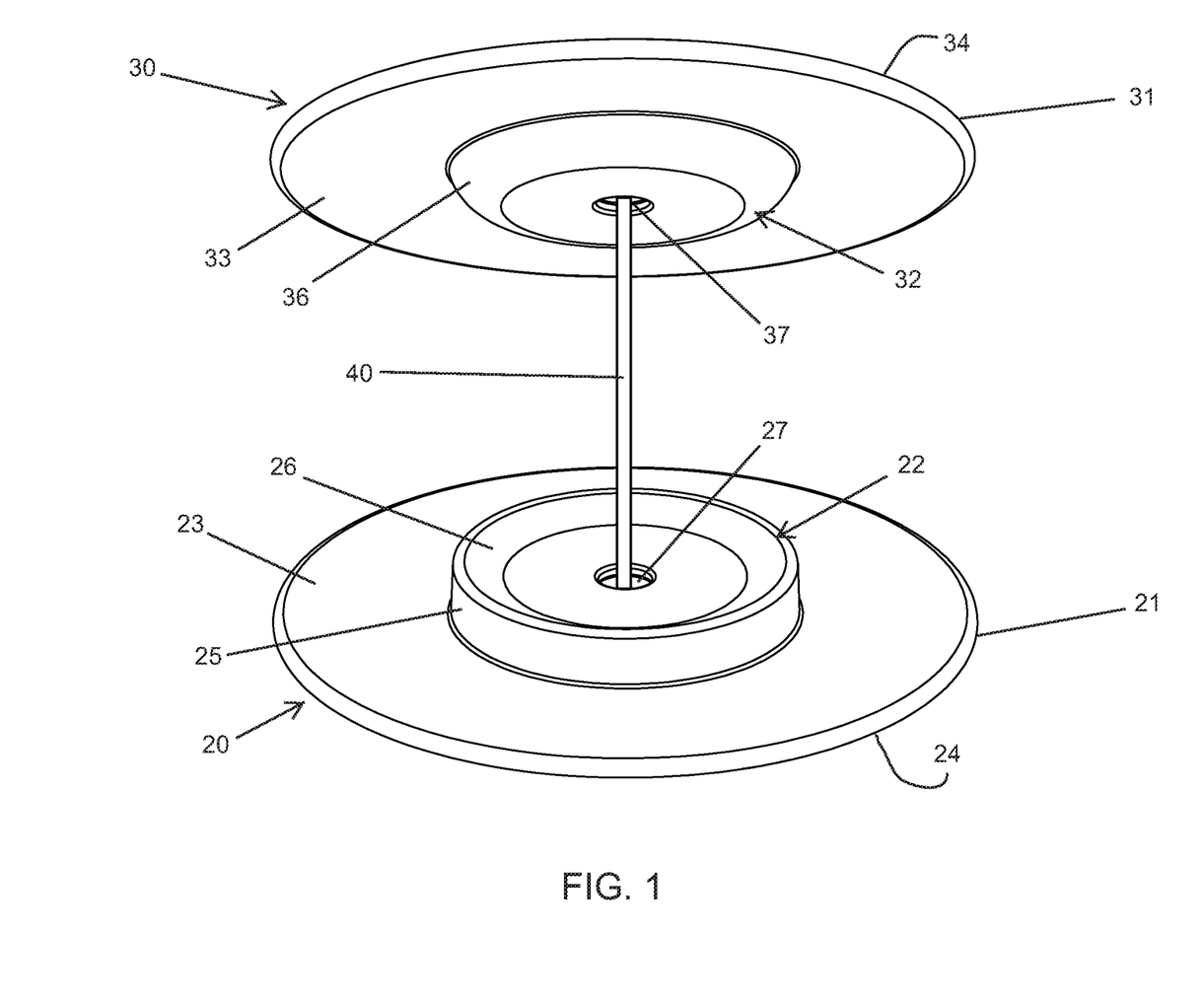
FIG. 1 schematically illustrates a perspective view of a first embodiment of the gripping apparatus with the gripping and base elements in a spaced apart, open position.

In accordance with a first embodiment of the present invention, as shown in FIG. 1, a gripping apparatus has two opposing portions that are connected to one another. A base element 20 is configured to be attached via its back surface 24 to the handheld electronic device to be gripped, and a gripping element 30 is elastically connected to base element 20 by a connecting member 40. In one embodiment, connecting member 40 has elasticity, such that gripping element 30 is elastically connected to base element 20 by an elastic connecting member 40. When gripping element 30 is pulled away from base element 20, a user's fingers are placed in the space between gripping element 30 and base element 20, preferably around connecting member 40, and then gripping element 30 is allowed to be pulled back towards base element 20 via connecting member 40, whereby the user's fingers are held therebetween, i.e., front surface 23 of flange element 21 of base element 20 and front surface 33 of flange element 31 of gripping element 30 hold the fingers of a user on opposite sides thereof, such that the user may securely grip the handheld electronic device securely and comfortably.

Figure 2A:
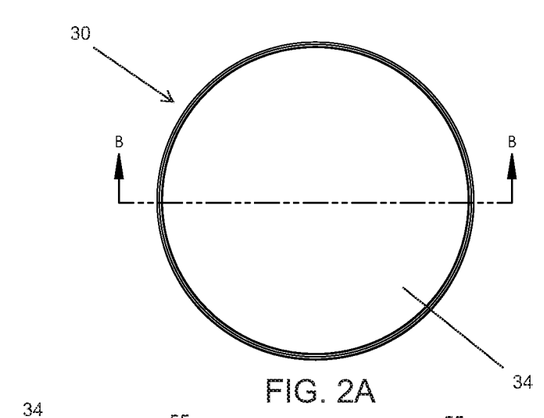
FIGS. 2A and 2B schematically illustrate a plan view and a cross sectional view, respectively, of the first embodiment of the gripping apparatus with the upper and base elements in a fully retracted position.
Figure 2B:
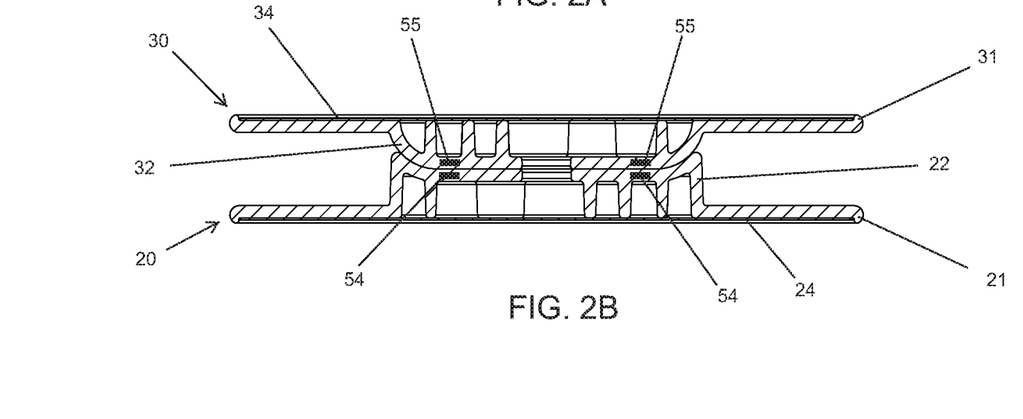

FIG. 2A shows the first embodiment of the gripping apparatus in a top, plan view, wherein only gripping element 30 can be seen, with only back surface 34 thereof being visible. FIG. 2B shows the first embodiment of the gripping apparatus in a cross-sectional view taken along line B-B of FIG. 2A. As illustrated in FIG. 2B, when in its retracted position, connecting member 40 is still under some tension and pulls gripping element 30 flush against base element 20, which is generally adhered to the handheld electronic device, so that, when not in use, the gripping apparatus has a low, flat profile that does not unduly protrude and interfere with transport and/or storage of the portable electronic device.

In order to extend the transmission distance of energy from a wireless charger on which gripping element 30 is resting to a portable electronic device attached to base element 20, base element 20 and gripping element 30 of the gripping apparatus are both fitted with electrical conduction and/or induction means in order to facilitate this energy transfer from the wireless charger to the portable electronic device.

In certain embodiments, the electrical conduction and/or induction means includes inductive coils. In one such embodiment, the electrical conduction means comprises induction coils in base element 20 and in gripping element 30 that use electromagnetic fields to facilitate the exchange of energy therebetween, as well as the exchange of energy with the wireless charging station and the exchange of energy with the portable electronic device.

Typically, a wireless charging station has an induction coil that creates an electromagnetic field, and the magnetic field from the wireless charger induces current in the induction coils in gripping element 30. In one embodiment, an induction coil in gripping element 30 takes power from the electromagnetic field of the wireless charging station and converts it into a second electromagnetic field, which induces an electrical current in an induction coil in base element 20, i.e., takes power from the second electromagnetic field, namely that of gripping element 30, and induces a third electromagnetic field. Power from the third electromagnetic field, i.e., that of base element 20, is converted by induction coils in the portable electronic device attached to base element 20 into an electrical current that is used to charge the portable electronic device.

In preferred embodiments wherein induction coils in gripping element 30 and in base element 20 facilitate the exchange of energy with the wireless charging station and the exchange of energy with the portable electronic device, respectively, these inductive coils are generally fitted at regions of gripping element 30 and of base element 20 that would be positioned close to the wireless charging station and to the portable electronic device, respectively, so that the induction coils in the wireless charging station/gripping apparatus and gripping apparatus/portable electronic device arrangements are spaced close together.

In embodiments wherein induction coils in gripping element 30 and in base element 20 facilitate the exchange of energy therebetween, these inductive coils are generally fitted at regions of base element 20 and of gripping element 30 that would be positioned close to each other when the gripping apparatus is in a closed, retracted position, wherein gripping element 30 is pulled flush against or secured to base element 20, for example as shown in FIG. 2B, so that the induction coils in each pair of induction coils in the wireless charging station/gripping apparatus/portable electronic device arrangement are spaced close together.

In certain embodiments, when connecting member 40 is in its retracted but still tensed position, gripping element 30 and base element 20 form a nesting configuration. For example, in one embodiment, as shown in FIG. 1, the central mounting region 32 of gripping element 30 has a convex contour, and the central mounting region 22 of base element 20 has a concave contour. As shown in cross-section in FIG. 2B, the convex contour of central mounting region 32 of gripping element 30 nests within the concave contour of central mounting region 22 of base element 20. In this embodiment, an induction coil assembly can be mounted within each of central mounting region 32 of gripping element 30 and central mounting region 22 of base element 20. Induction coils are well known in the field, and any appropriate induction coil assembly, such as a coil and ferrite assembly, can be used to meet the size and power requirements of this device.

In one example of this arrangement, as shown in the cross-sectional view of FIG. 2B, induction coil 54 (shown in cross-section) can be mounted within central mounting region 22 of base element 20, and induction coil 55 (shown in cross-section) can be mounted within central mounting region 32 of gripping element 30. As such, when the gripping apparatus is in a retracted position, gripping element 30 nests within base element 20, such that the convex contour of central mounting region 32 of gripping element 30 nests within the concave contour of central mounting region 22 of base element 20, as shown in FIG. 2B, whereby induction coil 55 that is mounted within central mounting region 32 of gripping element 30 is proximal to induction coil 54 that is mounted within central mounting region 22 of base element 20.

In another example of this arrangement, with reference to the components shown in FIG. 1, a first induction coil (not shown) can be mounted within concave central mounting region 22 of base element 20 between outer wall 25 and sloped inner wall 26, and a second induction coil assembly (not shown) can be mounted within convex central mounting region 32 of gripping element 30 underneath sloped wall 36. In this embodiment, the respective induction coils would be positioned somewhat further to the outer edges of central mounting region 22 of base element 20 and of central mounting region 32 of gripping element 30 than the positions of induction coils 54, 55 shown in FIG. 2B.

In yet another example of this arrangement, the induction coil assemblies may be located within flange element 21 and flange element 31 of base element 20 and gripping element 30, respectively, e.g., inside recesses under front surfaces 23 and 33 of base element 20 and gripping element 30, respectively, which may be outside the central mounting regions 22 and 32 of base element 20 and gripping element 30, respectively.

While, for ease of description, discussion of the induction coil assemblies is with regard to the embodiment in which they are located within the central mounting regions 32 and 22 of gripping element 30 and base element 20, respectively, it should be understood that such discussions apply equally to the embodiment in which they are located outside central mounting regions 32 and 22 of gripping element 30 and base element 20, respectively, and elsewhere within flange elements 31 and 21 of gripping element 30 and base element 20, respectively.

Alternatively, in another embodiment (not shown), it is central mounting region 32 of gripping element 30 that has a concave contour, and it is central mounting region 22 of base element 20 that has a convex contour, such that the convex contour of central mounting region 22 of base element 20 nests within the concave contour of central mounting region 32 of gripping element 30. In this embodiment, the placement of induction coils would be similar to those in the two arrangements discussed above.

It should be noted that, while use of induction coils to facilitate the exchange of energy between the wireless charging station and gripping element 30, between gripping element 30 and base element 20, and between base element 20 and the portable electronic device has been discussed with regard to embodiments in which, when not in use, the gripping apparatus can be set in a retracted position, in which gripping element 30 is pulled flush against base element 20, as shown in FIG. 2B, so that the gripping apparatus has a low, flat profile against the portable electronic device, induction coils can also be used to facilitate this same exchange of energy in alternative embodiments in which gripping element 30 is positively engaged with, held tightly against, or secured against base element 20. In certain embodiments, the gripping apparatus has features that allow this secured configuration to take place, as shown in FIGS. 9-14 of U.S. patent application Ser. No. 15/958,746, and these features can also incorporate similar electrical conduction and/or induction means.

In another embodiment in which the electrical conduction means includes inductive coils, the electrical conduction and/or induction means can comprise induction coils in base element 20 and in gripping element 30, which induction coils use electromagnetic fields to facilitate exchanges of energy with the portable electronic device and with the wireless charging station, respectively, but can also comprise electrical conduction means that use direct electrical conduction to facilitate the exchange of energy between base element 20 and gripping element 30. In this embodiment, an induction coil in gripping element 30 takes power from the electromagnetic field of wireless charging station, and a direct electrical connection between gripping element 30 and base element 20 transfers the electrical current from the induction coil in gripping element 30 to an induction coil in base element 20, and then the induction coil in base element 20 induces a second electromagnetic field. Power from the second electromagnetic field, i.e., that of base element 20, is converted by induction coils in the portable electronic device attached to base element 20 into an electrical current that is used to charge the portable electronic device.

In this embodiment, an induction coil assembly can be mounted within each of central mounting region 32 of gripping element 30 and central mounting region 22 of base element 20, in the manner as discussed above. For example, induction coil assemblies are mounted within gripping element 30 and within base element 20, such as in central mounting region 32 and central mounting region 22 thereof, respectively, in the manner as discussed above. However, as shown in FIG. 3, direct conduction means can also be mounted on the portions of gripping element 30 and base element 20 that contact each other directly, such as on the external surface of central mounting region 32 of gripping element 30 and on the external surface of central mounting region 22 of base element 20, in order to facilitate a direct exchange of energy therebetween.

Figure 3:
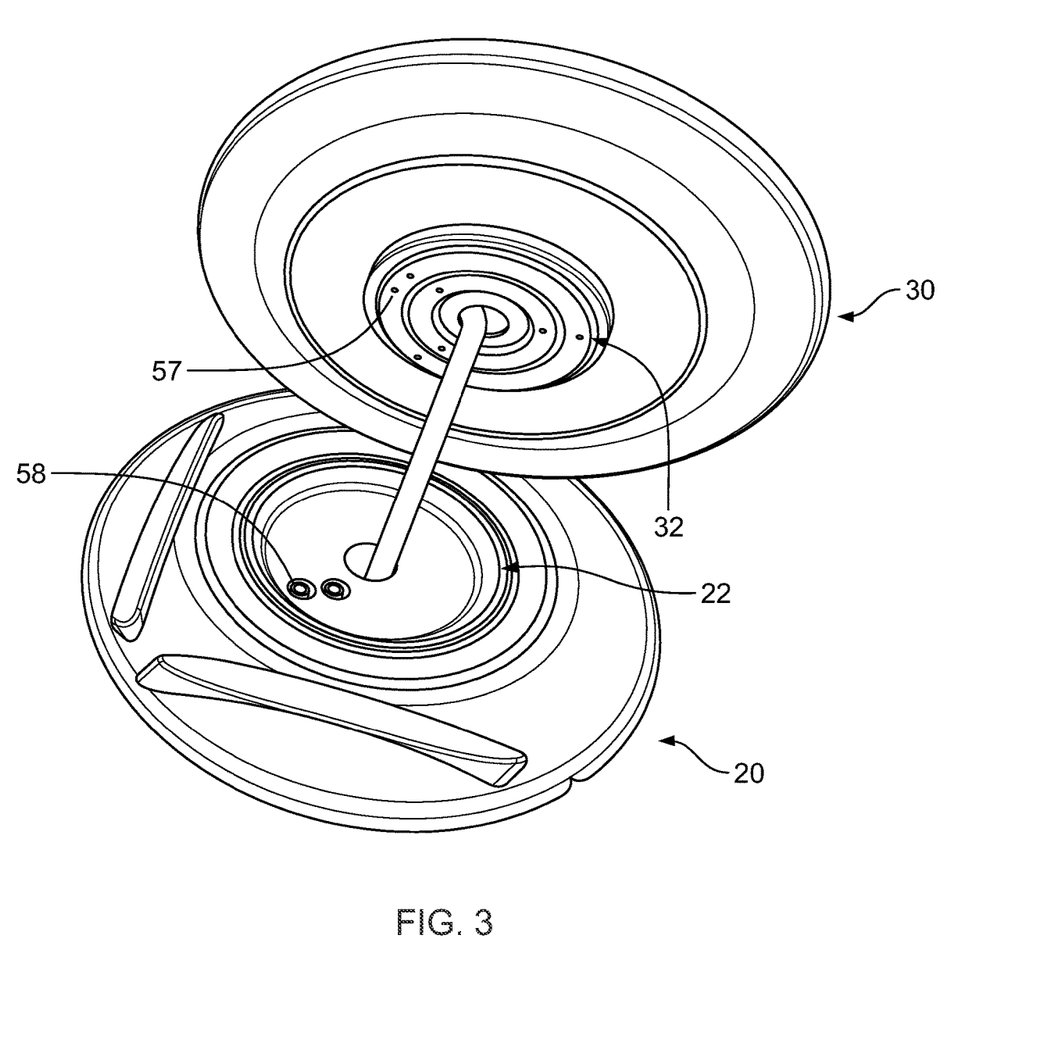
FIG. 3 shows a perspective view of a second embodiment of the gripping apparatus with the gripping and base elements in a spaced apart, open position.

In one such arrangement, as shown in FIG. 3, one or more PCBs 57 are mounted to the outside, convex portion of gripping element 30, such as by being adhered or affixed to the external surface of central mounting region 32 of gripping element 30, and conductive (e.g., copper) traces and components are mounted thereon to form an electrical/electronic circuit. PCB 57 can be any shape, but in certain embodiments PCB 57 is round or circular to match the shape of flange 31 of gripping apparatus 30. PCB 57 can be as known in the prior art, such as having an outside diameter of 14.05 mm, an inner diameter of 6.0 mm, a PCB thickness of 0.4 mm, and FR4 grade of PCB material. Within gripping element 30, lead wires from induction coil assemblies (not shown), e.g., the coil+ferrite assembly, are attached to traces on the PCB 57 in order to form a direct electrical connection between these parts.

As also shown in FIG. 3, one or more conductive pin 58 extends outward from the circular, concave central mounting region 22 of base element 20 and may be mounted to a trace on a PCB (not shown) positioned inside central mounting region 22 of base element 20. Conductive pins 58 may be as known in the art, e.g., made from copper, electroplated gold, etc. In certain embodiments, there is only one conductive pin 58. In certain other embodiments, there are two or more conductive pins 58. Within base element 20, lead wires from induction coil assemblies (not shown), e.g., the coil+ferrite assembly, are attached to the traces on an internal PCB on which conductive pins 58 are mounted so as to form a direct electrical connection between them.

As shown in FIG. 3, at least one conductive pin 58 is positioned within central mounting region 22 of base element 20 at a radius from receiving hole 27 that matches the radius from receiving hole 37 of at least one PCB 57 that is mounted to gripping element 30. In certain embodiments, as shown in FIG. 3, circular PCB 57 is formed of two concentric conductive traces on a PCB, each having a different radius from receiving hole 37, and two conductive pins 58 are arranged at different radii from receiving hole 27 to correspond to the radii of concentric circular traces of the PCBs 57, such that a first conductive pin 58 is configured to make a direct electrical connection with one PCB 57 trace, and a second conductive pin 58 is configured to make a direct electrical connection with a second concentric PCB 57 trace. However, the presence of the concentric rings 57 makes it necessary to have only one conductive pin 58 per ring; multiple conductive pins 58 are not needed, such that the design is more efficient.

In this embodiment, conductive pins 58 that are mounted onto base element 20 are in direct contact with the traces of the PCB circle 57 that is mounted to gripping element 30. The concentric traces of concentric PCB 57 on which conductive pins 58 make contact eliminate the need to index the gripping element 30 and base element 20 in specific orientations. In addition, in certain embodiments, conductive pins 58 may be spring-loaded, such that their heights adjust automatically to small gaps between the gripping element 30 and base element 20.

Alternatively, although this is not shown, in another version of this embodiment, it is central mounting region 32 of gripping element 30 that has a concave contour, and it is central mounting region 22 of base element 20 that has a convex contour, such that the convex contour of central mounting region 22 of base element 20 nests within the concave contour of central mounting region 32 of gripping element 30. In this embodiment, conductive pins 58 would be mounted within central mounting region 32 of gripping element 30, and PCB trace circles 57 would be mounted to central mounting region 22 of base element 20, and current would travel conductively from induction coil assembly 54 inside gripping element 30 through conductive pins 58 to PCB circles 57 and then to induction coil assembly 54 inside base element 20 and to the portable electronic device.

When it is desired for the gripping apparatus whose base element 20 is attached to a portable electronic device to be used to facilitate charging of that electronic device, the gripping apparatus would be set in a retracted position, such that gripping element 30 nests within or is secured against base element 20. In certain embodiments, the contour of central mounting region 32 of gripping element 30 nests with the contour of central mounting region 22 of base element 20. In certain embodiments, gripping element 30 is positively engaged with, held tightly against, or secured against base element 20. In this position, as seen in FIG. 2B, which shows the embodiment of the gripping apparatus of FIGS. 1 and 2A in a cross-sectional view, and as seen in FIG. 3, which shows the embodiment of the gripping apparatus in a perspective view, the electrical conduction means within base element 20 and within gripping element 30 facilitate the exchange of energy therebetween.

In embodiments in which induction coil assemblies are mounted within gripping element 30 and within base element 20 so as to facilitate a direct, inductive exchange of energy therebetween, gripping element 30 and base element 20 are positioned against each other in the manner as discussed above such that induction coils 54, 55 are positioned proximal to each other, as shown in FIG. 2B. In embodiments in which direct conduction means are mounted on gripping element 30 and base element 20 so as to contact each other directly and facilitate a direct, conductive exchange of energy therebetween, gripping element 30 and base element 20 are positioned against each other in the manner as discussed above, such that conductive pins 58 mounted to base element 20 are in direct contact with the traces of the PCB circle 57 mounted to gripping element 30, as shown in FIG. 3.

At this point, gripping element 30 of the gripping apparatus can then be set onto the pad of an energized, wireless charger.

At that time, the portable electronic device communicates with the wireless charger through the gripping apparatus to set power levels and begin the charging process. The transmitting coil in the wireless charger generates an oscillating magnetic field, which induces an alternating current in the coils+ferrite induction coil assembly 54 inside gripping element 30. In one embodiment, where conductive pins 58 and PCB circle 57 are present, current travels through the lead wires of the coils+ferrite induction coil assembly 54 in gripping element 30 to PCB circle 57, and, by virtue of the direct electrical contact between conductive pins 58 and the concentric traces on the PCB circle 57, travels to conductive pins 58 and through them to induction coil assembly 55 in base element 20. In another embodiment, where conductive pins 58 and PCB circle 57 are not present, induction coil assembly 54 inside gripping element 30 generates an oscillating magnetic field and induces an alternating current in induction coil assembly 55 in base element 20. Finally, induction coil assembly 55 in base element 20 generates an oscillating magnetic field and induces an alternating current in the receiving coil inside the portable electronic device attached to base element 20 that charges the battery of the portable electronic device.

As mentioned above, the electrical conduction means discussed herein can also be used to facilitate this same exchange of energy in alternative embodiments in which gripping element 30 can be engaged with, held tightly to, or secured against base element 20, such as wherein the gripping apparatus has features that allow this secured configuration to take place, as shown in FIGS. 9-14 of U.S. patent application Ser. No. 15/958,746.

For example, this configuration of the electrically conductive means discussed hereinabove can also be accomplished with an embodiment of the gripping apparatus as shown in FIGS. 9-12B of U.S. patent application Ser. No. 15/958,746, wherein upper element 30 can be made to engage with or fit tightly or securely against base element 20 by way of one or more projections 43 that project upward from the front surface 23 of flange element 21 of base element 20 and cooperate with a corresponding number of arcuate slots 45 formed into front surface 33 of flange element 31 of gripping element 30, or by way of one or more projections 43 that project upward from the front surface 33 of flange element 31 of gripping element 30 and cooperate with a corresponding number of arcuate slots 45 formed into front surface 23 of flange element 21 of base element 30, as illustrated in FIG. 4.

Figure 4:
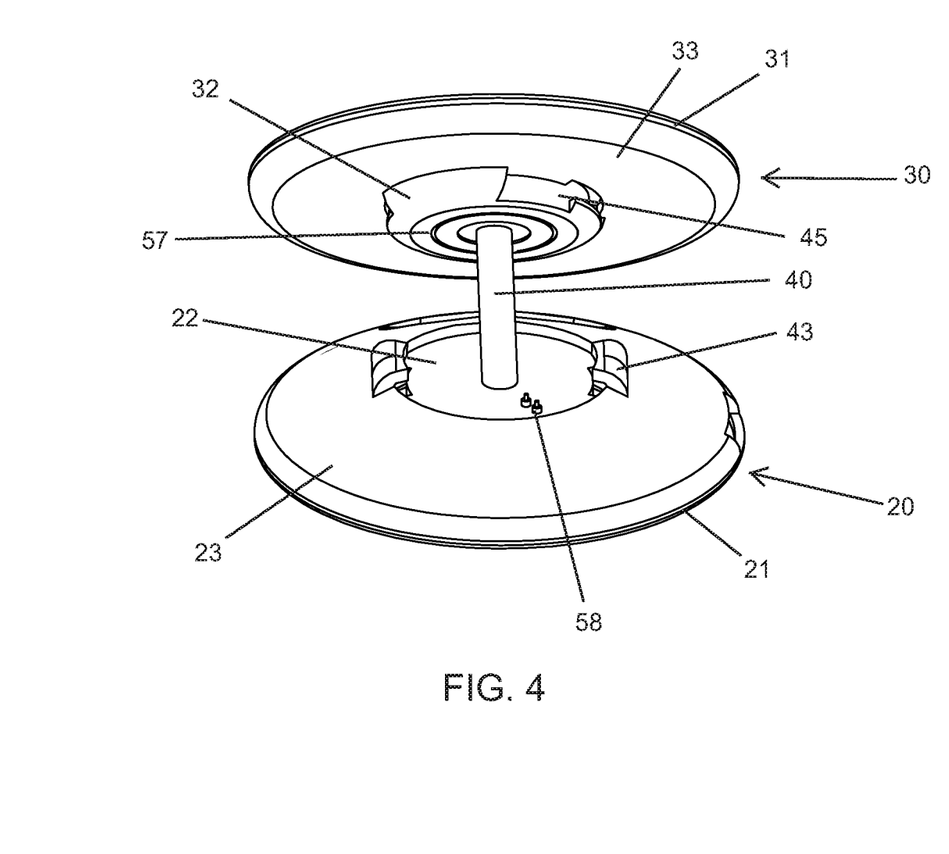
FIG. 4 schematically illustrates a perspective view of another configuration of the second embodiment of the gripping apparatus with the gripping and base elements in a spaced apart, open position.

As shown in FIG. 4, induction coil assemblies (not shown) are mounted within central mounting region 32 of gripping element 30 and within central mounting region 22 of base element 20, in the manner as discussed above. One or more PCBs 57 that are electrically connected to internal induction coils are mounted to the external surface of central mounting region 32 of gripping element 30, and one or more conductive pins 58 mounted to a PCB (not shown) that is electrically connected to internal induction coils extend outward from central mounting region 22 of base element 20. Each conductive pin 58 is positioned within central mounting region 22 of base element 20 at a radius from receiving hole 27 that matches the radius from receiving hole 37 of a corresponding PCB 57 that is set within central mounting region 32 of gripping element 30. The charging process proceeds similar to the process described above with regard to the embodiment depicted in FIGS. 3A and 3B.

Alternatively, although this is not shown, in another version of this second embodiment, it is central mounting region 32 of gripping element 30 that has a concave contour and projections 43 as described, and it is central mounting region 22 of base element 20 that has a convex contour and arcuate slots 45 as described, such that the convex contour of central mounting region 22 of base element 20 nests within and can be secured against, engaged with or locked into the concave contour of central mounting region 32 of upper element 30. In this embodiment, conductive pins 58 would be mounted within central mounting region 32 of gripping element 30, and PCB trace circles 57 would be mounted to central mounting region 22 of base element 20, and charges would travel from induction coil assembly 54 inside gripping element 30 through conductive pins 58 to PCB trace circles 57 and then to induction coil assembly 54 inside base element 20 and to the portable electronic device.

Figure 5:
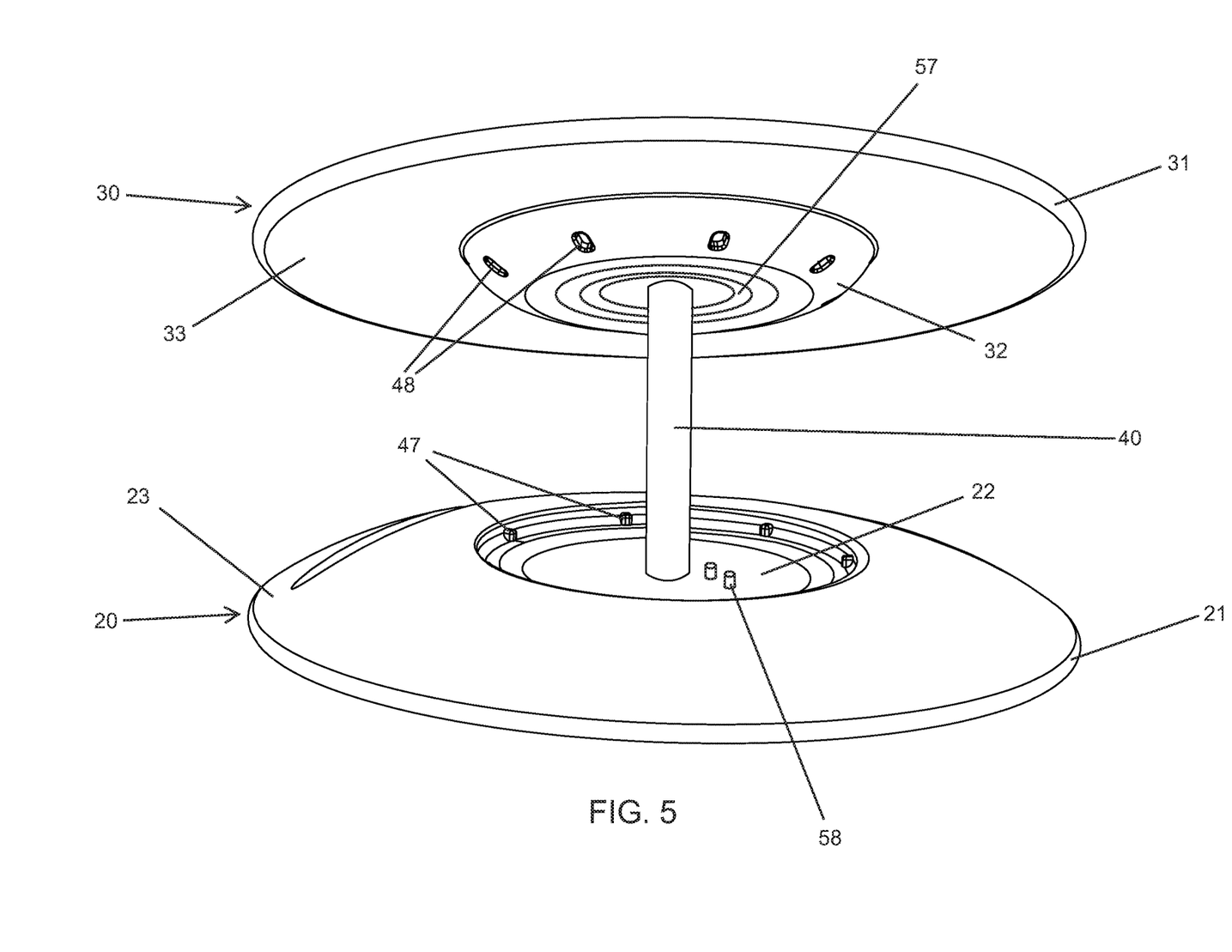
FIG. 5 schematically illustrates a perspective view of yet another configuration of the second embodiment of the gripping apparatus with the upper and base elements in a spaced apart, open position.

In another example, this configuration of the electrically conductive means discussed hereinabove can also be accomplished with another configuration of the gripping apparatus, as shown in FIG. 13 of U.S. patent application Ser. No. 15/958,746, wherein base element 20 and upper element 30 can engage with or fit tightly against each other, such as by surface contours that are opposite in shape and fit tightly within each other. As shown in FIG. 5 herein, surface protrusions 47 on front surface 23 of base element 20 and cooperating surface indentations 48 in front surface 33 of upper element 30 that allow upper element 30 to rest flush against, and tightly fit against, base element 20. Alternatively, front surface 23 of base element 20 may have indentations and front surface 33 of upper element 30 may have cooperating protrusions, that allow upper element 30 to rest flush against, and tightly fit against, base element 20.

As shown in FIG. 5, induction coil assemblies (not shown) are mounted within central mounting region 32 of gripping element 30 and within central mounting region 22 of base element 20, in the manner as discussed above. One or more PCBs 57 that are electrically connected to internal induction coils are mounted to the external surface of central mounting region 32 of gripping element 30, and conductive pins 58 mounted to a PCB (not shown) that is electrically connected to internal induction coils extend outward from central mounting region 22 of base element 20. Each conductive pin 58 is positioned within central mounting region 22 of base element 20 at a radius from receiving hole 27 that matches the radius from receiving hole 37 of a corresponding PCB 57 trace that is set within central mounting region 32 of gripping element 30. The charging process proceeds similar to the process described above with regard to the embodiment depicted in FIG. 3.

In another configuration, as shown in FIG. 5, surface protrusions 47 can be configured to have the functionality of conductive pins 58, and cooperating surface indentations 48 can be configured to have the functionality of PCBs 57. In this embodiment, while surface protrusions 47 and surface indentations 48 cooperated to allow upper element 30 to rest flush against, and tightly fit against, base element 20, at least one surface protrusion 47 and at least one surface indentation 48 can also be configured to have electrical conductivity in the manner of conductive pins 58 and PCB 57 traces. Specifically, at least one surface protrusion 47 can be formed as a conductive pin 58, as described hereinabove, such that it is mounted to a PCB (not shown) and forms a direct electrical connection with an induction coil assembly inside base element 20 (not shown), and at least one surface indentation 48 can be an aperture that allows access to a PCB 57 under the surface of central mounting region 32 of gripping element 30, such that the at least one electrically conductive surface protrusion 47 in base element 20 forms an electrical connection with an internal PCB 57 of gripping element 30 when electrically conductive surface protrusion 47 cooperates with at least one apertured surface indentation 48.

The embodiment shown in FIG. 5 can be used wherein the direct electrical conduction of electricity is carried out only by conductive pins 58 and PCB 57 traces, only by electrically conductive surface protrusion 47 and apertured surface indentation 48, or by a combination of both.

In a further example, the configuration of the direct electrically conductive means discussed hereinabove can be accomplished with yet another configuration of the gripping apparatus, as shown in FIG. 14 of U.S. patent application Ser. No. 15/958,746, wherein front surface 23 of base element 20 has a concave or indented (e.g., inset) section 54 in the attachment region 22 thereof in the shape of an indented circular gear arranged around receiving hole 27 having a plurality of slots 56 where gear teeth would be and a corresponding of plurality of peaks 59 between them where the gaps between gear teeth would be, and wherein front surface 33 of upper element 30 has a plurality of cooperating surface nodes, ribs or projections 52 in the attachment region 32 thereof positioned around receiving hole 37 that cooperate with slots 56 of indented gear-shaped section 54 in front surface 23 of base element 20, so as to allow upper element 30 to align in virtually any rotational position against base element 20 and to fit tightly against base element 20.

Figure 6A:
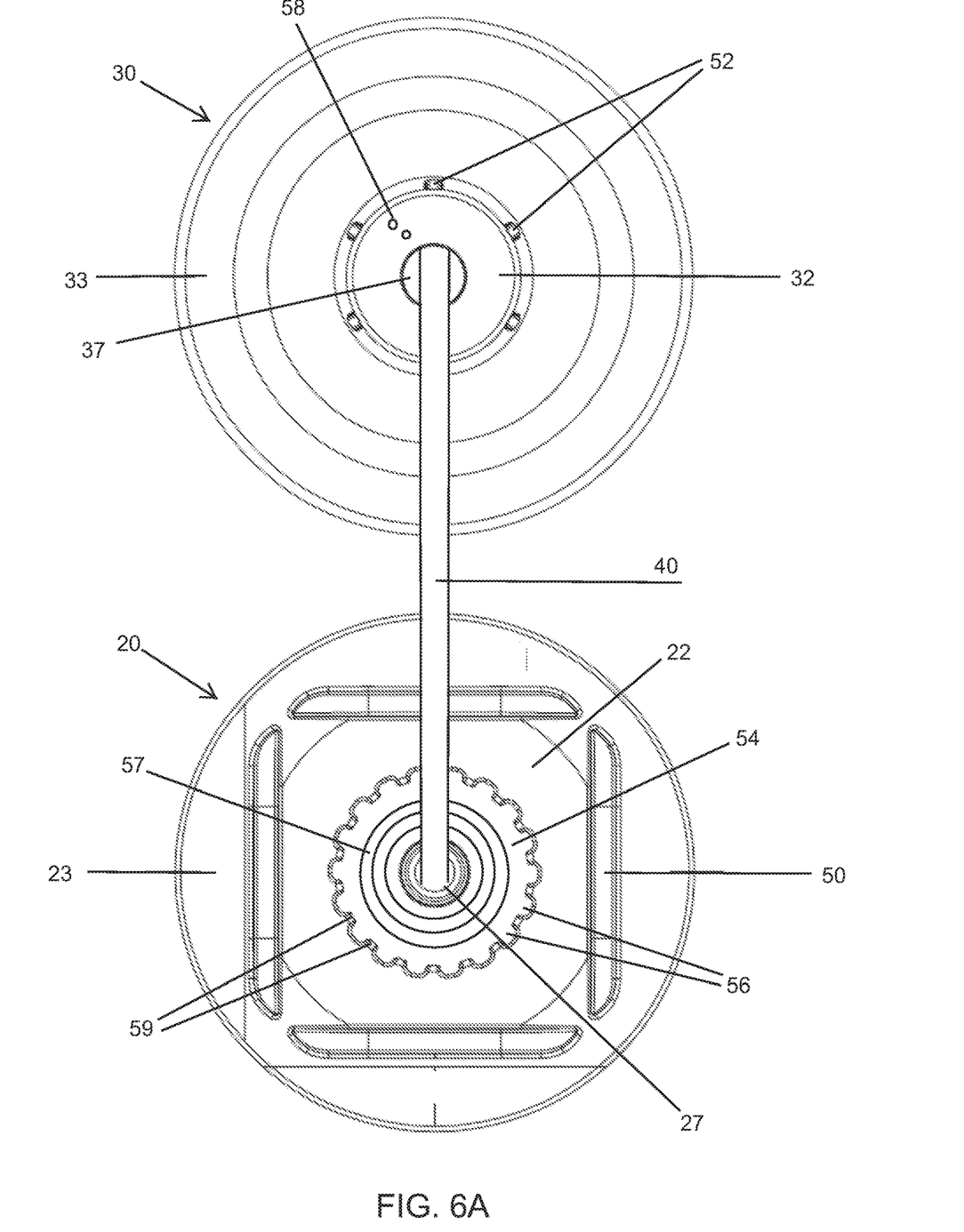
FIGS. 6A and 6B are schematic illustrations of a plan view and a perspective view, respectively, of an additional configuration of the second embodiment of the gripping apparatus with the upper and base elements in a spaced apart, open position.
Figure 6B:
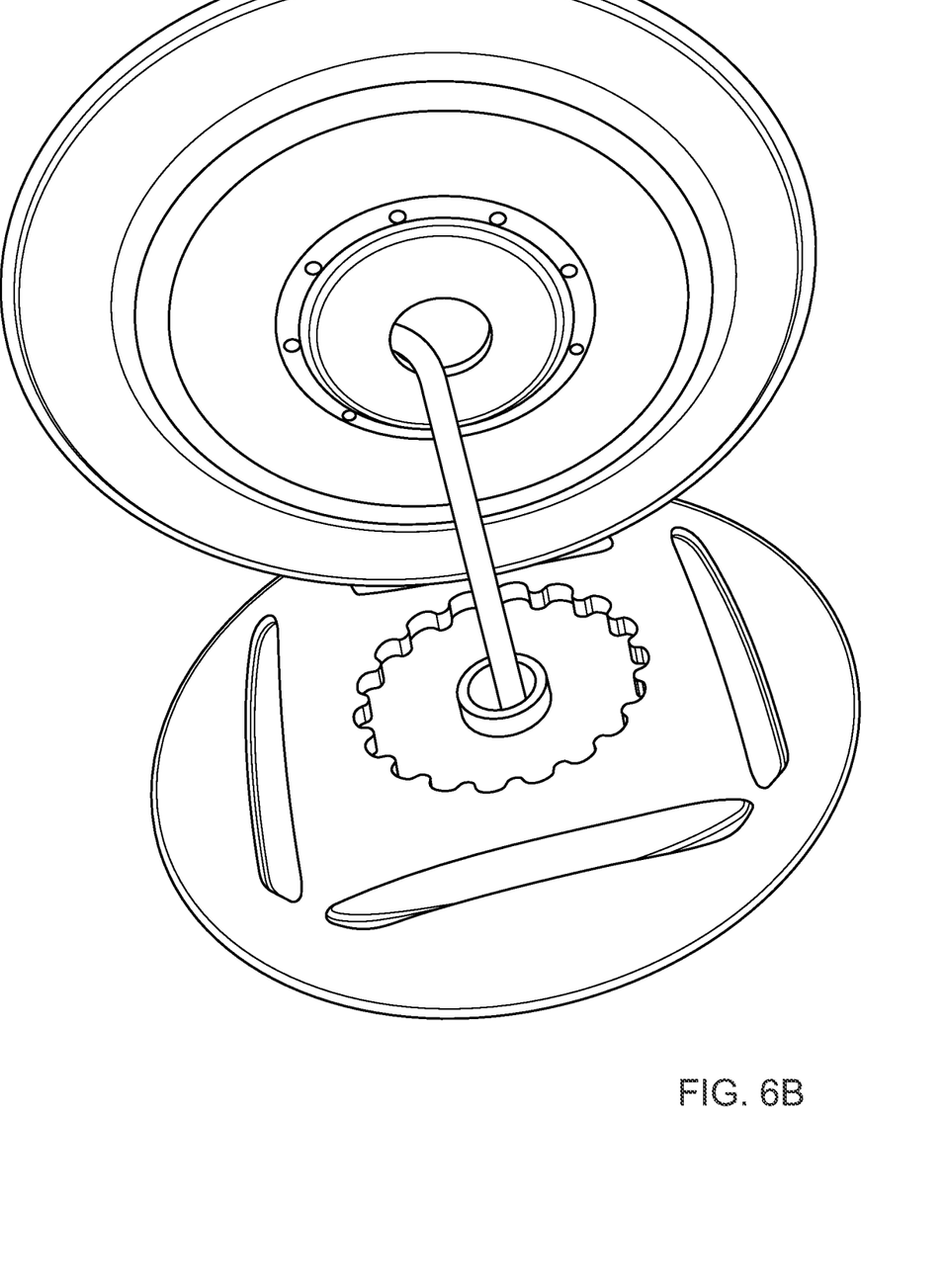

As shown in FIG. 6A, induction coil assemblies (not shown) are mounted within central mounting region 32 of gripping element 30 and within central mounting region 22 of base element 20, in the manner as discussed above. One or more PCBs 57 that are electrically connected to internal induction coils are mounted to the external surface of central mounting region 22 of base element 20, specifically inside indented gear-shaped section 54, and one or more conductive pins 58 mounted to a PCB (not shown) that is electrically connected to internal induction coils extend outward from central mounting region 32 of gripping element 30. Each conductive pin 58 is positioned within central mounting region 32 of gripping element 30 at a radius from receiving hole 37 that matches the radius from receiving hole 27 of a corresponding PCB 57 that is set within indented gear-shaped section 54 in central mounting region 22 of base element 20. The charging process proceeds similar to the process described above with regard to the embodiment depicted in FIGS. 3A and 3B.

In another configuration of FIG. 6A, surface projections 52 can be configured to have the functionality of conductive pins 58, and indented gear-shaped section 54 can be configured to have the functionality of PCBs 57. In this embodiment, while surface projections 52 and slots 56 of indented gear-shaped section 54 cooperate to allow upper element 30 to rest flush against, and tightly fit against, base element 20, at least one surface projection 52 and indented gear-shaped section 54 can also be configured to have electrical conductivity in the manner of conductive pins 58 and PCBs 57. Specifically, at least one surface projection 52 can be formed as a conductive pin 58, as described hereinabove, such that it is mounted to a PCB (not shown) and forms a direct electrical connection with an induction coil assembly inside base element 20 (not shown), and indented gear-shaped section 54 may have a PCB 57 on the surface of central mounting region 32 of gripping element 30, such that the at least one electrically conductive surface projection 52 in base element 20 forms an electrical connection with a PCB 57 trace in indented gear-shaped section 54 of gripping element 30 when electrically conductive surface projections 52 cooperates with slots 56 of indented gear-shaped section 54.

The embodiment shown in FIG. 6A can be used wherein the direct electrical conduction of electricity is carried out only by conductive pins 58 and PCBs 57, only by electrically conductive surface projection 52 and PCBs 57, or by a combination of both.

In another version of this embodiment, rather than an indented section in the attachment region 22, front surface 23 of base element 20 may have a raised section 54 in the attachment region 22 thereof which is in the shape of a circular gear situated around receiving hole 27, as may also be seen in FIG. 6A. The raised circular gear shape 54 would have a plurality of teeth 56 therearound with gaps 59 between the plurality of teeth 56. The plurality of cooperating surface nodes, ribs or projections 52 positioned around receiving hole 37 in attachment region 32 of front surface 33 of upper element 30 cooperate with gaps 59 between the teeth 56 of raised gear-shaped section in front surface 23 of base element 20, so as to allow upper element 30 to align in virtually any rotational position against base element 20 and to fit tightly against base element 20. In this version, one or more PCBs 57 that are electrically connected to internal induction coils are mounted to the external surface of central mounting region 22 of base element 20, either inside or outside raised gear-shaped section 54, and one or more conductive pins 58 mounted to a PCB (not shown) that is electrically connected to internal induction coils extend outward from central mounting region 32 of gripping element 30 at a position so as to electrically engage with PCB 57. Each conductive pin 58 is positioned within central mounting region 32 of gripping element 30 at a radius from receiving hole 37 that matches the radius from receiving hole 27 of a corresponding PCB 57 that is set within or around raised gear-shaped section 54 in central mounting region 22 of base element 20. The charging process proceeds similar to the process described above with regard to the embodiment depicted in FIGS. 3A and 3B.

In another configuration of this other version of FIG. 6A, surface projections 52 can be configured to have the functionality of conductive pins 58 to engage electrically with PCBs 57 that are mounted either inside or outside raised gear-shaped section 54. In this embodiment, at least one surface projection 52 and raised gear-shaped section 54 can also be configured to have electrical conductivity in the manner of conductive pins 58 and PCBs 57. Specifically, at least one surface projection 52 can be formed as a conductive pin 58, as described hereinabove, such that it is mounted to a PCB (not shown) and forms a direct electrical connection with an induction coil assembly inside base element 20 (not shown), and PCB 57 may be set around or on raised gear-shaped section 54 on the surface of central mounting region 32 of gripping element 30, such that the at least one electrically conductive surface projection 52 in base element 20 forms an electrical connection with PCB 57 of gripping element 30 when electrically conductive surface projections 52 cooperates with slots 56 of indented gear-shaped section 54.

Alternatively, front surface 23 of base element 20 may have surface projections 52 positioned around receiving hole 37, and front surface 33 of upper element 30 may have an indented gear-shaped concave section 54 (or a convex section in the shape of a raised circular gear), that allow upper element 30 to engage with and tightly fit against base element 20.

It should be noted that the gripping apparatus for gripping a handheld device that incorporates charging means to enable a wireless charger to charge the handheld device even when the device and charger are not in direct contact, as described herein, can be any gripping apparatus in addition to those described and depicted herein. For example, as long as the gripping apparatus has two opposing portions that are connected to one another, the electrical conduction and/or induction means can be used to facilitate an energy transfer from the wireless charger to the portable electronic device. Thus, in accordance with additional embodiments of this invention, any gripping apparatus having two opposing portions that are connected to one another, namely a base element 20 configured to be attached to the handheld electronic device to be gripped and a gripping element 30 connected to base element 20 by a connecting member 40, is included within the scope of this invention. In these embodiments, in order to extend the transmission distance of energy from a wireless charger on which gripping element 30 is resting to a portable electronic device attached to base element 20, base element 20 and gripping element 30 of the gripping apparatus both fitted with electrical conduction and/or induction means described hereinabove in order to facilitate this energy transfer from the wireless charger to the portable electronic device.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An improved apparatus for gripping a portable electronic device and for facilitating wireless charging of the portable electronic device via an external wireless charging apparatus when the portable electronic device is not in direct contact with the external wireless charging apparatus, the apparatus having a base element adapted to be attached to the electronic device and a gripping element connected to the base element, the apparatus comprising:
   a first electrical induction coil arranged within the gripping element; and
   a second electrical induction coil arranged within the base element;
   wherein the first electrical induction coil is configured to generate an electrical current as a result of a magnetic field in the external wireless charging apparatus;
   wherein the first electrical induction coil is configured to conduct electricity to the second electrical induction coil; and
   wherein the second electrical induction coil is configured to generate a magnetic field so as to induce an electrical current inside the portable electronic device.

2. The apparatus of claim 1, wherein the first electrical induction coil is arranged proximal to an external surface of the gripping element and is configured such that, when the external surface of the gripping element is placed proximal to the external wireless charging apparatus, the first electrical induction coil can generate an electrical current as a result of a magnetic field in the external wireless charging apparatus.

3. The apparatus of claim 1, wherein the second electrical induction coil is arranged proximal to an external surface of the base element and is configured such that, when the external surface of the base element is placed proximal to the portable electronic device, the second electrical induction coil can generate a magnetic field so as to induce an electrical current inside the electronic device sufficient to charge the portable electronic device.

4. The apparatus of claim 3, wherein the external surface of the base element has an adhesive layer thereon for securely attaching the base element to the portable electronic device.

5. The apparatus of claim 1, wherein the first electrical induction coil is arranged proximal to an internal surface of the gripping element and the second electrical induction coil is arranged proximal to an internal surface of the base element such that, when the internal surface of the gripping element is placed proximal to or against the internal surface of the base element, the first electrical induction coil is configured to conduct electricity to the second electrical induction coil via induction.

6. The apparatus of claim 5, wherein, when the internal surface of the gripping element is placed proximal to or against the internal surface of the base element, the first electrical induction coil is configured to generate a magnetic field so as to induce an electrical current inside the second electrical induction coil.

7. The apparatus of claim 1, further comprising at least one direct electrical connection between the gripping element and the base element,
wherein, when an internal surface of the gripping element is placed against an internal surface of the base element, the first electrical induction coil is configured to conduct electricity to the second electrical induction coil via direct conduction.

8. The apparatus of claim 7, wherein the at least one direct electrical connection comprises at least one conductive pin on one of the gripping element, and the base element and at least one PCB circle on the other of the gripping element and the base element.

9. The apparatus of claim 7, further comprising a connecting element for connecting the gripping element and the base element at respective attachment regions thereof, wherein said respective attachment regions comprise means for direct electrical conduction between the gripping element and the base element when the internal surface of the gripping element is placed against the internal surface of the base element.

10. The apparatus of claim 1, wherein, when the base element is placed against or proximal to the electronic device, the gripping element is placed against or proximal to the base element and the gripping element is placed against or proximal to the external wireless charging apparatus, the magnetic field in the external wireless charging apparatus effectively charges the portable electronic device through the first electrical induction coil and the second electrical induction coil.

11. An apparatus for gripping a portable electronic device and for charging the portable electronic device via a wireless charger when the device and the wireless charger are not in direct contact, comprising:
a base element adapted to be attached to the electronic device,
a gripping element connected to the base element,
a first electrical induction coil arranged within the gripping element and configured to generate an electrical current as a result of a magnetic field in the wireless charger, and
a second electrical induction coil arranged within the base element and configured to generate a magnetic field so as to induce an electrical current inside the portable electronic device,
wherein the first electrical induction coil is configured to conduct electricity to the second electrical induction coil, either through induction or through direct conduction.

12. The apparatus of claim 11, wherein the first electrical induction coil is arranged proximal to an internal surface of the gripping element and the second electrical induction coil is arranged proximal to an internal surface of the base element such that, when the internal surface of the gripping element is placed proximal to the internal surface of the base element, the first electrical induction coil is configured to conduct electricity to the second electrical induction coil via induction.

13. The apparatus of claim 12, wherein, when the internal surface of the gripping element is placed proximal to the internal surface of the base element, the first electrical induction coil is configured to generate a magnetic field so as to induce an electrical current inside the second electrical induction coil.

14. The apparatus of claim 11, further comprising at least one direct electrical connection between the gripping element and the base element,
wherein, when the internal surface of the gripping element is placed against the internal surface of the base element, the first electrical induction coil is configured to conduct electricity to the second electrical induction coil via direct conduction through the at least one direct electrical connection.

15. The apparatus of claim 14, wherein the at least one direct electrical connection comprises at least two conductive pins or protrusions on one of the gripping element, and the base element and PCB trace circles on the other of the gripping element and the base element.

16. The apparatus of claim 14, further comprising a connecting element for connecting the gripping element and the base element at respective attachment regions thereof, wherein said respective attachment regions comprise means for direct electrical conduction between the gripping element and the base element when the internal surface of the gripping element is placed against the internal surface of the base element.

17. The apparatus of claim 11, wherein, when the base element is placed against or proximal to the electronic device, the gripping element is placed against or proximal to the base element and the gripping element is placed against or proximal to the external wireless charging apparatus, the magnetic field in the external wireless charging apparatus effectively charges the portable electronic device through the first electrical induction coil and the second electrical induction coil.

* * * * *